(12) United States Patent
Liu et al.

(10) Patent No.: US 7,929,093 B2
(45) Date of Patent: Apr. 19, 2011

(54) PIXEL STRUCTURE AND LIQUID CRYSTAL DISPLAY HAVING THE SAME

(75) Inventors: Sung-Kao Liu, Hsinchu (TW); Shih-Chyuan Fan Jiang, Hsinchu (TW); Ching-Huan Lin, Hsinchu (TW); Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 114 days.

(21) Appl. No.: 12/051,829

(22) Filed: Mar. 19, 2008

(65) Prior Publication Data
US 2009/0168003 A1 Jul. 2, 2009

(30) Foreign Application Priority Data

Jan. 2, 2008 (TW) .............................. 97100043 A

(51) Int. Cl.
*G02F 1/1339* (2006.01)
(52) U.S. Cl. ........................................................ 349/129
(58) Field of Classification Search .................. 349/129
See application file for complete search history.

(56) References Cited

U.S. PATENT DOCUMENTS

| 7,023,516 B2 | 4/2006 | Yoshida et al. |
| 7,576,806 B2* | 8/2009 | Huang et al. ................... 349/39 |
| 2005/0041186 A1* | 2/2005 | Shimoshikiryo ............. 349/129 |
| 2006/0146243 A1 | 7/2006 | Nakanishi et al. |
| 2007/0046878 A1* | 3/2007 | Huang .......................... 349/129 |
| 2007/0296902 A1* | 12/2007 | Lee et al. ...................... 349/141 |

FOREIGN PATENT DOCUMENTS

| CN | 101013239 | 8/2007 |
| CN | 101017303 | 8/2007 |
| TW | 495625 | 7/2002 |

OTHER PUBLICATIONS

"1st Office Action of China counterpart application", issued on Aug. 7, 2009, p1-p6.

* cited by examiner

*Primary Examiner* — David Nelms
*Assistant Examiner* — Phu Vu
(74) *Attorney, Agent, or Firm* — Jianq Chyun IP Office

(57) ABSTRACT

A pixel structure including an active device and a pixel electrode is provided. The pixel electrode is electrically connected with the active device and has a plurality of alignment domains. Each of the alignment domains of the pixel electrode has one group of alignment slits parallel with one another, wherein each group of the alignment slits includes a plurality of first alignment slits with a first length and the first alignment slits are majority of each group of the alignment slits. At least one group of the alignment slits includes at least a second alignment slit with a second length longer than the first length of the first alignment slits.

32 Claims, 8 Drawing Sheets

PIXEL STRUCTURE AND LIQUID CRYSTAL DISPLAY HAVING THE SAME

CROSS-REFERENCE TO RELATED APPLICATION

This application claims the priority benefit of Taiwan application serial no. 97100043, filed on Jan. 2, 2008. The entirety of the above-mentioned patent application is hereby incorporated by reference herein and made a part of this specification.

BACKGROUND OF THE INVENTION

1. Field of the Invention

The present invention relates to a pixel structure and a liquid crystal display, and particularly relates to a pixel structure and a liquid crystal display with favorable display quality.

2. Description of Related Art

As the sizes of liquid crystal displays become larger, the demand for liquid crystal displays with high contrast ratio, rapid response, and wide viewing angle is increasing. To solve the problem of the large-sized liquid crystal display panels limited viewing angle, the technology of wide viewing angle needs to be improved. Liquid crystal display panels of multi-domain vertical alignment mode (MVA mode), such as multi-domain vertical alignment (MVA) liquid crystal display panels and polymer stabilized alignment (PSA) liquid crystal display panels, are common examples of wide viewing angle technology.

The conventional MVA mode liquid crystal display panel changes the direction of an electric field through alignment protrusions and/or alignment slits located on a color filter substrate or a thin film transistor array substrate. Thereby, the liquid crystal molecules are controlled to tilt in various directions so as to increase the viewing angle of the liquid crystal display.

FIG. 1A is a schematic cross-sectional view of a conventional MVA mode liquid crystal display panel, and FIG. 1B is a schematic top view illustrating a pixel structure of the conventional MVA mode liquid crystal display panel in FIG. 1A. Referring to FIGS. 1A and 1B, the conventional MVA mode liquid crystal display panel 1 comprises a first substrate 10, a second substrate 20, an alignment structure 30, and a liquid crystal layer 40. Each pixel on the first substrate 10 comprises an active device 14 and a pixel electrode 12 connected with the active device 14. The second substrate 20 is disposed above the first substrate 10 with an intervening cell-gap between the second substrate 20 and the first substrate 10. In addition, the second substrate 20 has a common electrode 22. In the MVA mode liquid crystal display panel 1, the alignment structure 30 may be fabricated on the first substrate 10 and the second substrate 20. Referring to FIG. 1A, the alignment structure 30 comprises alignment protrusions 32 on the second substrate 20 and alignment slits 34 on the pixel electrode 12. In addition, the liquid crystal layer 40 is disposed between the first substrate 10 and the second substrate 20.

As shown in FIG. 1B, the pixel electrode 12 is divided into four alignment domains which are a first alignment domain 12a, a second alignment domain 12b, a third alignment domain 12c, and a fourth alignment domain 12d. The alignment slits 34 in the first alignment domain 12a have a plurality of first alignment slits 34a parallel with one another. The alignment slits 34 in the second alignment domain 12b have a plurality of second alignment slits 34b parallel with one another. The alignment slits 34 in the third alignment domain 12c have a plurality of third alignment slits 34c parallel with one another, and the alignment slits 34 in the fourth alignment domain 12d have a plurality of fourth alignment slits 34d parallel with one another.

It is noted that the alignment slits 34 are symmetrically arranged, specifically, the first alignment slits 34a and the second alignment slits 34b are mirror images to each other. Further, the first alignment slits 34a and the second alignment slits 34b are mirror images to the third alignment slits 34c and the fourth alignment slits 34d.

In addition, the liquid crystal molecules of the MVA mode liquid crystal display panel 1 are vertically aligned, and the alignment structure 30 controls the liquid crystal molecules in different domains to tilt in different directions so as to achieve the wider viewing angle. The alignment slits 34 are symmetrically arranged, and the liquid crystal molecules of each pixel should also be arranged symmetrically. However, the liquid crystal molecules in the center of different pixels are arranged asymmetrically, which causes the pixels to have discrepant brightness when displaying the same gray-level image. As a consequence, the display quality of the conventional MVA mode liquid crystal display 1 is poor.

SUMMARY OF THE INVENTION

The present invention provides a pixel structure having stably arranged liquid crystal molecules.

The present invention provides a liquid crystal display having favorable display quality.

The present invention provides a pixel structure including an active device and a pixel electrode. The pixel electrode is electrically connected with the active device and has a plurality of alignment domains, and each of the alignment domains comprises a group of alignment slits parallel with one another, wherein each group of the alignment slits comprises a plurality of first alignment slits with a first length and the first alignment slits are the majority in each group of the alignment slits. At least one group of the alignment slits further comprises at least a second alignment slit with a second length longer than the first length of the first alignment slits.

In an embodiment of the present invention, areas of the aforesaid alignment domains are substantially equal.

In an embodiment of the present invention, the number of the aforesaid alignment domains is 4.

In an embodiment of the present invention, each alignment domain of the aforesaid pixel electrode further comprises a third alignment slit with a third length which is shorter than the first length of the first alignment slits and parallel with the first alignment slits.

In an embodiment of the present invention, the aforesaid pixel electrode further comprises a fourth slit and the second alignment slits are arranged symmetrically along an extending direction of the fourth slit.

In an embodiment of the present invention, the aforesaid fourth slit is disposed at the border between neighboring alignment domains.

In an embodiment of the present invention, the aforesaid pixel structure further comprises a common line disposed at the border between the alignment domains and across the pixel electrode.

In an embodiment of the present invention, the aforesaid pixel electrode further comprises at least a fourth slit which is parallel with the common line and above the common line.

In an embodiment of the present invention, the aforesaid alignment slits are closed slits.

In an embodiment of the present invention, the aforesaid alignment slits extend to the edge of the pixel electrode.

The present invention provides a liquid crystal display which comprises an active device array substrate, an opposite substrate, and a liquid crystal layer. The active device array substrate has a plurality of scan lines, a plurality of data lines, and a plurality of pixel structures, wherein the pixel structures are respectively electrically connected with one of the scan lines and one of the data lines correspondingly. Each pixel structure comprises an active device and a pixel electrode. The pixel electrode is electrically connected with the active device and has a plurality of alignment domains, and each of the alignment domains comprises a group of alignment slits parallel with one another, wherein each group of the alignment slits comprises a plurality of first alignment slits with a first length and the first alignment slits are the majority in each group of the alignment slits. At least one group of the alignment slits further comprises at least a second alignment slit with a second length longer than the first length of the first alignment slits. The liquid crystal layer is disposed between the active device array substrate and the opposite substrate.

In an embodiment of the present invention, areas of the aforesaid alignment domains are substantially equal.

In an embodiment of the present invention, the number of the aforesaid alignment domains is 4.

In an embodiment of the present invention, each alignment domain of the aforesaid pixel electrode further comprises a third alignment slit with a third length which is shorter than the first length of the first alignment slit and parallel with the first alignment slits.

In an embodiment of the present invention, the aforesaid pixel electrode further comprises at least a fourth slit and the second alignment slits are arranged symmetrically along an extending direction of the fourth slit.

In an embodiment of the present invention, the aforesaid fourth slit is disposed at the border between neighboring alignment domains.

In an embodiment of the present invention, the aforesaid pixel structure further comprises a common line disposed at the border between the alignment domains and across the pixel electrode.

In an embodiment of the present invention, the aforesaid pixel electrode further comprises at least a fourth slit which is parallel with the common line and above the common line.

In an embodiment of the present invention, the aforesaid alignment slits are closed slits.

In an embodiment of the present invention, the aforesaid alignment slits extend to the edge of the pixel electrode.

In the aforesaid pixel structure, the second alignment slits are longer than the first alignment slits. Consequently, the pixel structure easily controls the tilt directions of the liquid crystal molecules in the center of pixel so that each alignment domain has substantially the same brightness when displaying the same gray-level image.

To make the above and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

Figure 1A:
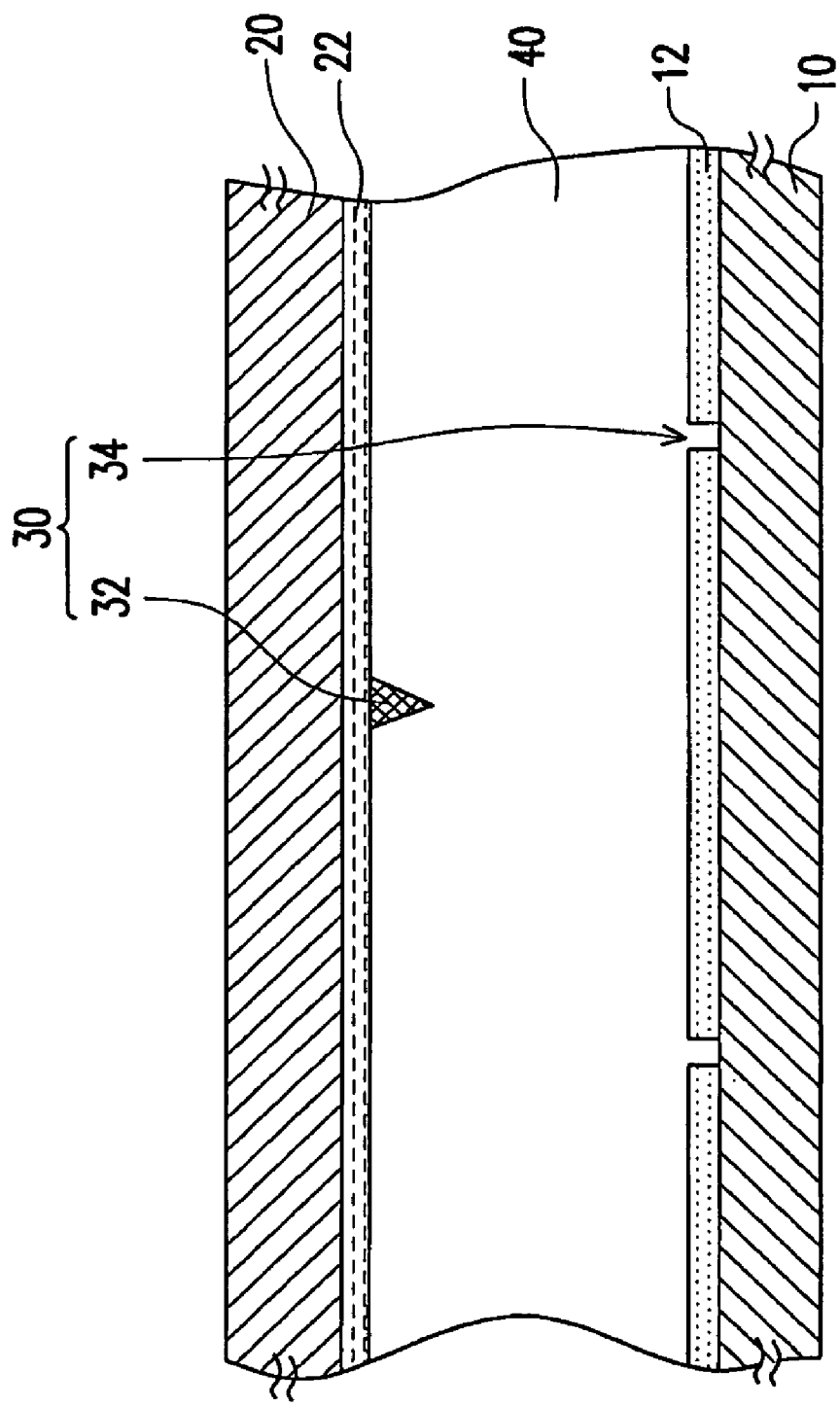
FIG. 1A is a schematic cross-sectional view of a conventional MVA mode liquid crystal display panel.
Figure 1B:
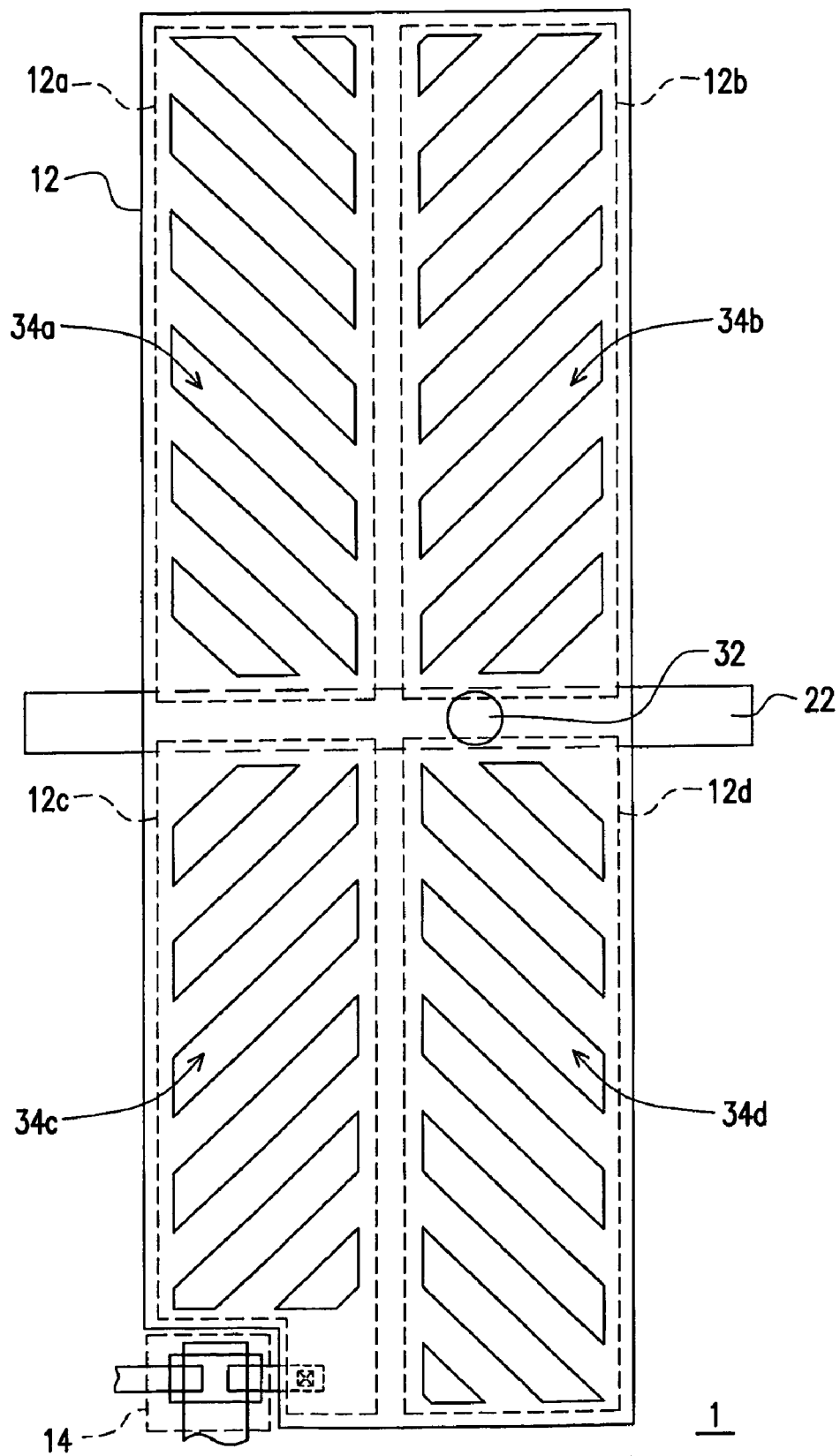
FIG. 1B is a schematic top view illustrating a pixel structure of the conventional MVA mode liquid crystal display panel in FIG. 1A.
Figure 2:
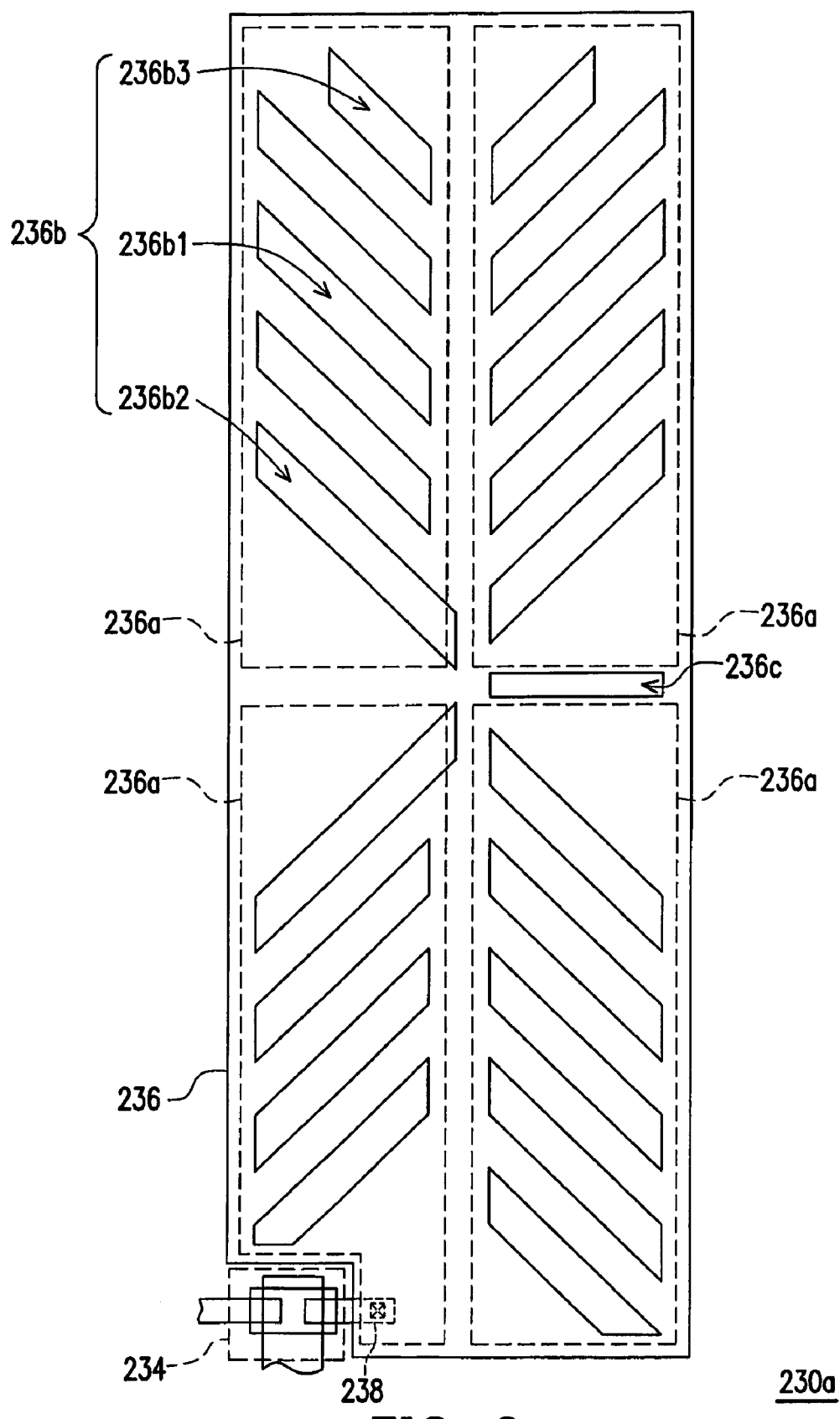
FIG. 2 is a schematic top view of a pixel structure according to the present invention.

FIG. 2 is a schematic top view of a pixel structure according to the present invention. Referring to FIG. 2 each pixel structure 230a of this embodiment comprises an active device 234 and a pixel electrode 236. The pixel electrode 236 is electrically connected with the active device 234. In this embodiment, the pixel electrode 236 is electrically connected with the active device 234 through a contact 238, for example. The pixel electrode 236 is divided into a plurality of alignment domains 236a, and each of the alignment domains 236a comprises a group of alignment slits 236b parallel with one another, and the alignment slits 236b of neighboring alignment domains 236a are arranged symmetrically. Specifically, the extending directions of alignment slits 236b in different alignment domains 236a are not parallel with one another. Each group of the alignment slits 236b comprises first alignment slits 236b1 and second alignment slits 236b2. In addition, the first alignment slits 236b1 are the majority and have the same first length. At least one alignment domain 236a has the alignment slits 236b which further comprise at least a second alignment slit 236b2 with the second length. The second alignment slit 236b2 is longer than the first alignment slits 236b1 and extends out of the alignment domains 236a, as shown in FIG. 2. In other word, the second length is longer than the first length. Furthermore, the second alignment slit 236b2 are substantially parallel with first alignment slits 236b1.

In this embodiment, the number of the alignment domains 236a is 4. Hence, the pixel electrode 236 is divided into four different alignment domains 236a, and the areas of the alignment domains 236a are substantially equal. Generally, the alignment slits 236b are used to control an arrangement of liquid crystal molecules. In this embodiment, the second alignment slits 236b2 are longer than the first alignment slits 236b1. The second alignment slits 236b2 extend out of the alignment domains 236a toward a center of the pixel structure 230a. Consequently, the pixel structure 230a is capable of controlling tilt directions of the liquid crystal molecules in the center of the pixel structure 230a easily so that each alignment domain 236a of the pixel electrode 236 has the same brightness when displaying the same gray-level image.

It is noted that, the pixel electrode 236 of this embodiment is a transparent pixel electrode 236. However, the present invention is not limited thereto. In other embodiments, the pixel electrode 236 may be a reflective electrode.

Referring to FIG. 2, each group of the alignment slits 236b of the pixel electrode 236 further comprises at least a third alignment slit 236b3 with the third length shorter than the first length of the first alignment slits 236b1. In this embodiment, the first alignment slits 236b1, the second alignment slits 236b2, and the third alignment slits 236b3 of the alignment domain 236a are parallel with one another. In addition, the pixel electrode 236 further comprises at least a fourth slit 236c and the second alignment slits 236b2 are arranged symmetrically along an extending direction of the fourth slit 236c so as to control the tilt directions of the liquid crystal molecules.

In this embodiment, the first alignment slits 236b1, the second alignment slits 236b2, the third alignment slits 236b3, and the fourth slit 236c are closed slits. It is noted that the alignment slits 236 of the present invention are not limited to closed slits. In other embodiments, the alignment slits 236 may be open slits (shown in FIG. 3), i.e. the alignment slits 236b extend to the edge of the pixel electrode 236.

Figure 3:
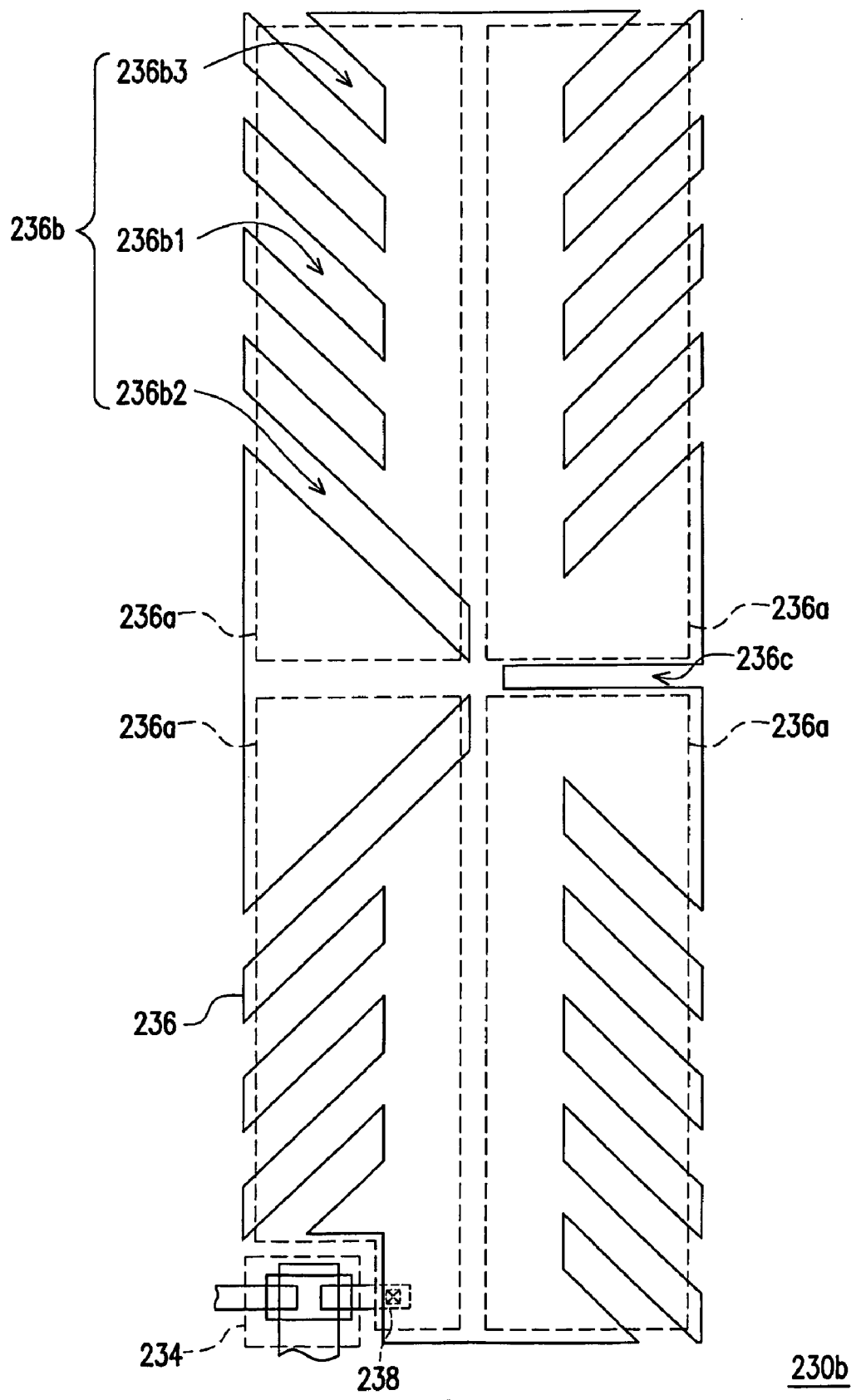
FIG. 3 is a schematic top view of another pixel structure according to the present invention.

FIG. 3 is a schematic top view of another pixel structure according to the present invention. In this embodiment, a pixel structure 230b has open alignment slits 236b and a open fourth slit 236c. The first alignment slits 236b1, the second alignment slits 236b2, and the third alignment slits 236b3 extend to the edge of the pixel electrode 236.

Figure 4:
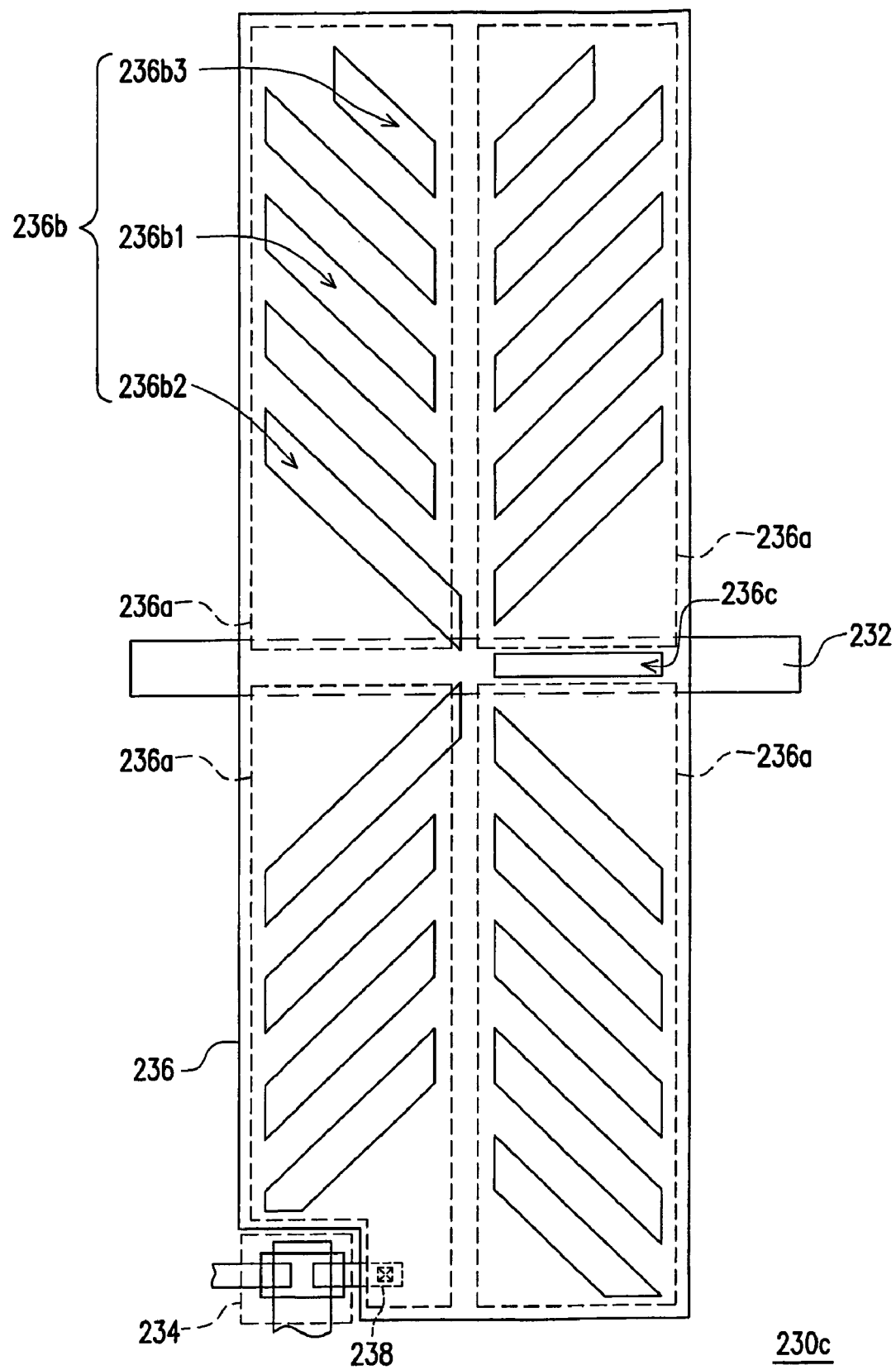
FIG. 4 is a schematic top view of yet another pixel structure according to the present invention.

FIG. 4 is a schematic top view of another pixel structure according to the present invention. Referring to FIG. 4, a pixel structure 230c of this embodiment further comprises a common line 232 disposed at the border between the alignment domains 236a and across the pixel electrode 236, thus the common line 232 is electrically coupled to the pixel electrode 236 to compose of a storage capacitor in the pixel structure 230c. In this embodiment, the fourth slit 236c is located above the common line 232 and parallel with the common line 232. In addition, the second alignment slits 236b2 are arranged symmetrically along an extending direction of the fourth slit 236c.

It is noted that the storage capacitor disclosed in this embodiment is composed of the common line 232 and the pixel electrode 236. However, the present invention is not limited thereto. In other embodiments, the storage capacitor may be composed of the scan line and the pixel electrode.

If the pixel structure 230a, the pixel structure 230b, or the pixel structure 230c of the present invention is applied to a liquid crystal display, the wider viewing angle can be achieved, and the tilt directions of the liquid crystal molecules are controlled to have better display quality. In addition, the present invention makes use of a design that the second alignment slits 236b2 are longer than the first alignment slits 236b1 to control the tilt directions of the liquid crystal molecules in the center of pixel structure 230a. Consequently, each pixel has substantially the same brightness when displaying the same gray-level image.

The following paragraphs detail the aforesaid pixel structure 230c applied in the liquid crystal display.

Figure 5A:
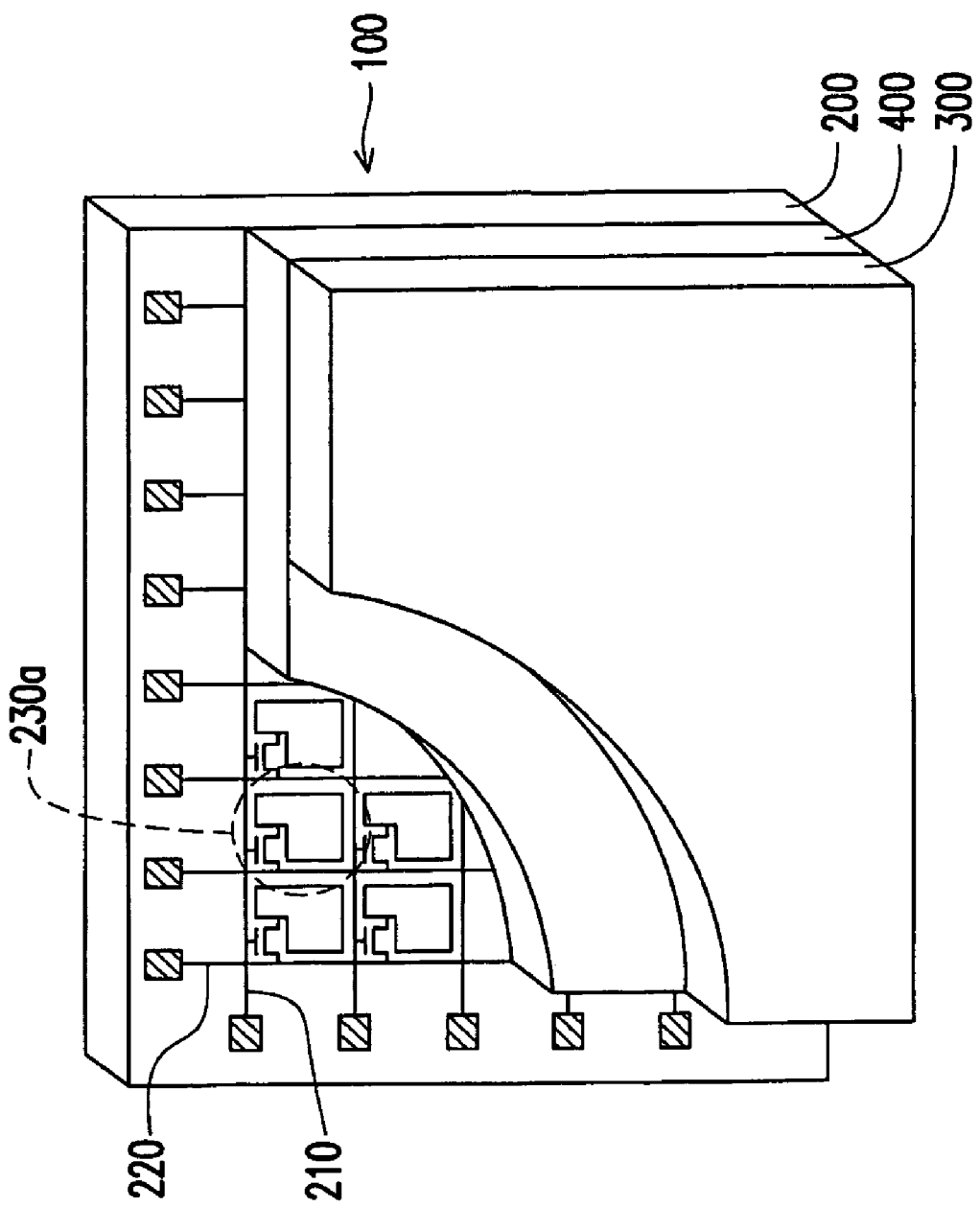
FIG. 5A is a schematic view of a liquid crystal display according to an embodiment of the present invention.

FIG. 5A is a schematic view of a liquid crystal display according to an embodiment of the present invention. Referring to FIG. 5A, a liquid crystal display 100 of this embodiment comprises an active device array substrate 200, an opposite substrate 300, and a liquid crystal layer 400. The active device array substrate 200 has a plurality of scan lines 210, a plurality of data lines 220, and a plurality of pixel structures 230a. In addition, the pixel structures 230a are respectively electrically connected with the corresponding scan lines 210 and data lines 220. The liquid crystal layer 400 is disposed between the active device array substrate 200 and the opposite substrate 300.

Figure 5B:
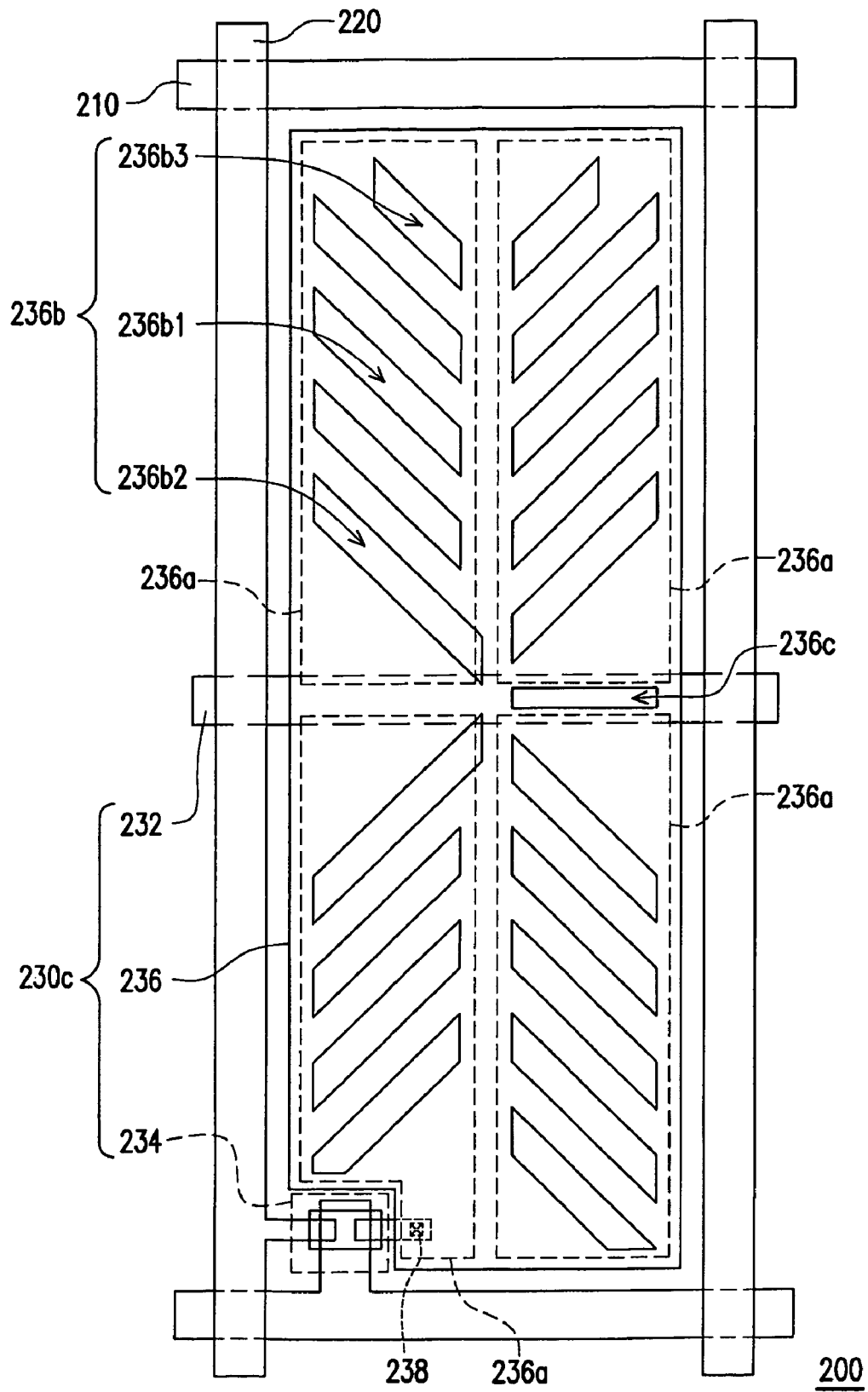
FIG. 5B is a schematic top view illustrating an upper portion of an active array substrate in FIG. 5A.

FIG. 5B is a schematic top view illustrating an upper portion of the active array substrate in FIG. 5A. Referring to FIG. 5B, in order to clearly describe the present invention, only one of the pixel structures is shown in FIG. 5B. The active device array substrate 200 comprises a plurality of pixel structures 230c, which may be the pixel structures 230a shown in FIG. 2, the pixel structures 230b shown in FIG. 3, or the pixel structures 230c shown in FIG. 4. The illustration of FIG. 5B is based on the pixel structures 230c shown in FIG. 4.

Referring to FIG. 5B, the pixel structure 230c of the active device array substrate 200 comprises an active device 234 and a pixel electrode 236. The pixel electrode 236 is, for example, a transparent pixel electrode electrically connected with the active device 234 through a contact 238. The number of the alignment domains 236a is 4. Hence, the pixel electrode 236 is divided into four different alignment domains 236a. Areas of the alignment domains 236a are substantially equal, and each of the alignment domains 236a has a group of alignment slits 236b parallel with one another. The alignment slits 236b of neighboring alignment domains 236a are arranged symmetrically. Each group of alignment slits 236b comprises first alignment slits 236b1 which are the majority and have the same first length. At least one alignment domain 236a has the alignment slits 236b which further comprise at least a second alignment slit 236b2 with the second length. The second alignment slit 236b2 is longer than the first alignment slits 236b1 and extends out of the alignment domains 236a. That is, the second length is longer than the first length.

In addition, the alignment slits 236b of each alignment domain 236a further comprise at least a third alignment slit 236b3 with the third length and at least a fourth slit 236c. The third length of the third alignment slit 236b3 is shorter than the first length of the first alignment slits 236b1. Further, the first alignment slits 236b1, the second alignment slits 236b2, and the third alignment slit 236b3 of the alignment domains 236a are parallel with one another. The second alignment slits 236b2 are arranged symmetrically along an extending direction of the fourth slit 236c so as to control the tilt directions of the liquid crystal molecules.

Specifically, in this embodiment, the second alignment slits 236b2 are longer than the first alignment slits 236b1, and the fourth slit 236c is disposed to precisely control the liquid crystal molecules in the center of pixel structure 230a to tilt toward the location of the fourth slit 236c so that each alignment domain of the pixel electrode 236 has substantially the same brightness when displaying the same gray-level image. In addition, the present invention makes use of a design that the second alignment slits 236b2 are longer than the first alignment slits 236b1 and extend out of the alignment domains 236a toward the center of the pixel structure 230a so as to control the tilt directions of the liquid crystal molecules. Consequently, each pixel has substantially the same brightness when displaying the same gray-level image.

Figure 6:
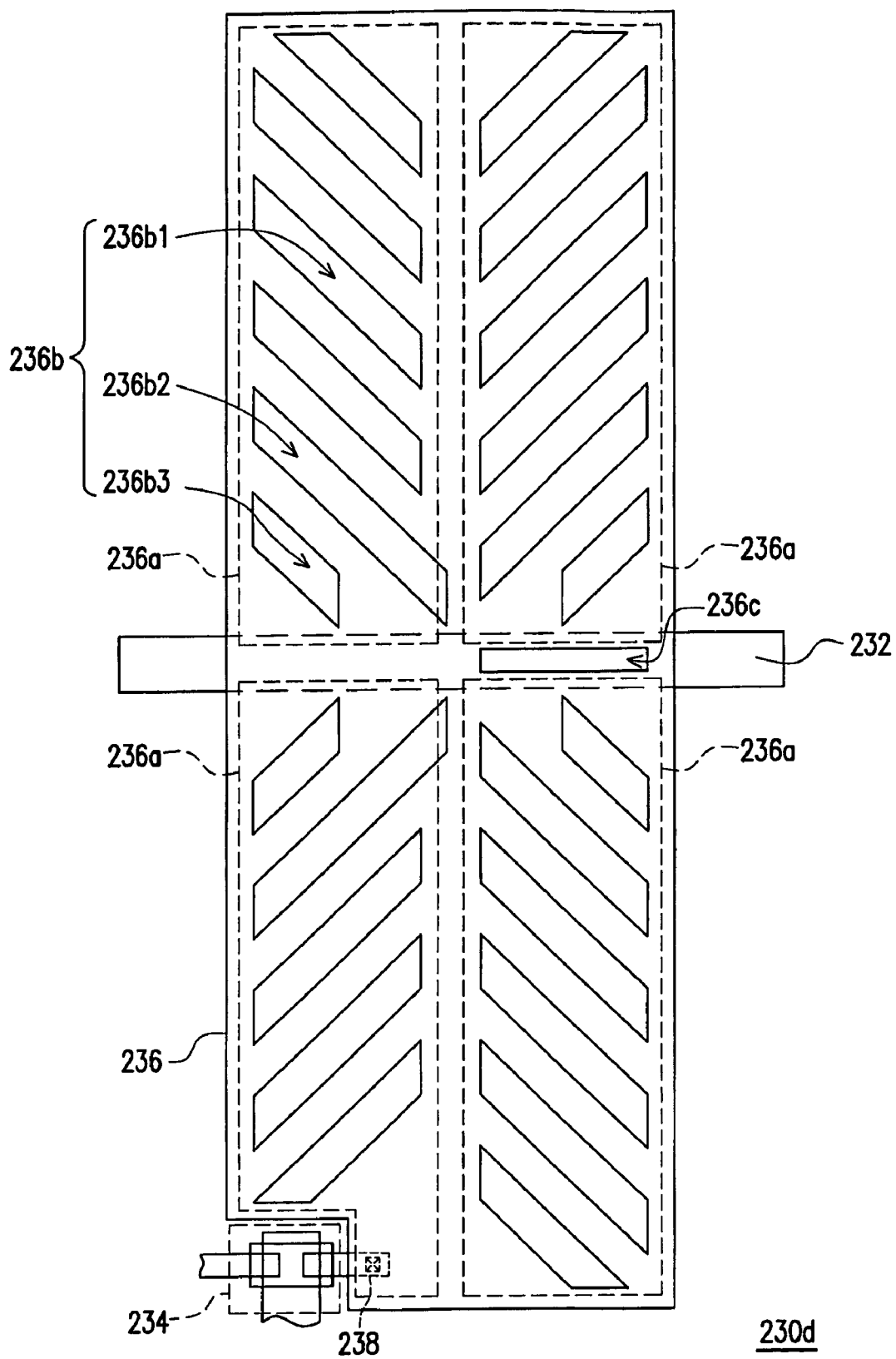
FIG. 6 is a schematic top view of another pixel structure according to the present invention.

Certainly, the present invention is not intended to limit the arrangement and disposition of the alignment slits 236b and the fourth slit 236c. It is to say that the first alignment slits 236b1, the second alignment slits 236b2, the third alignment slits 236b3, and the fourth slit 236c may be disposed in other ways, such as a pixel structure 230d shown in FIG. 6.

To sum up, the slit design of the pixel structure according to the present invention effectively controls the arrangement of the liquid crystal molecules to improve the problem that each pixel has discrepant brightness when displaying the same gray-level image. In addition, a conventional driving circuit and fabrication process are applicable in manufacturing the pixel structure of the present invention. Hence, the present invention does not increase production costs.

Although the present invention has been disclosed by the above embodiments, they are not intended to limit the present invention. Anybody skilled in this art may make modifications and variations without departing from the spirit and scope of the present invention. Therefore, the protection range of the present invention falls in the appended claim.

What is claimed is:

1. A pixel structure, comprising:
a substrate comprising a plurality pixel region, a plurality of scan lines and a plurality of data lines, wherein each pixel region is defined by two neighboring scan lines and two neighboring data lines;
an active device; and
a pixel electrode electrically connected with the active device, disposed within one of the pixel region and has a plurality of alignment domains and a spacing region disposed between the plurality of alignment domains to separate the plurality of alignment domains within said pixel region, each of the alignment domains comprising a group of alignment slits parallel with one another, wherein each group of the alignment slits comprises a plurality of first alignment slits with a first length and the first alignment slits are the majority in each group of the alignment slits, at least one group of the alignment slits further comprises at least a second alignment slit with a second length longer than the first length of the first alignment slits, and the at least a second alignment slit of one of the alignment domains extends into the spacing region, wherein all of the alignment domains have the first alignment slits, and only a portion of the alignment domains has the at least a second alignment slit.

2. The pixel structure of claim 1, wherein areas of the alignment domains are substantially equal.

3. The pixel structure of claim 1, wherein a number of the alignment domains is 4.

4. The pixel structure of claim 1, wherein each of the alignment domains further comprises a third alignment slit with a third length shorter than the first length of the first alignment slits and parallel with the first alignment slits.

5. The pixel structure of claim 1, wherein the pixel electrode further comprises at least a fourth slit and the second alignment slits are arranged symmetrically along an extending direction of the fourth slit.

6. The pixel structure of claim 5, wherein the fourth slit is disposed at a border between neighboring alignment domains.

7. The pixel structure of claim 1, further comprising a common line disposed at a border between the alignment domains and across the pixel electrode.

8. The pixel structure of claim 7, wherein the pixel electrode further comprises at least a fourth slit which is parallel with the common line and above the common line.

9. The pixel structure of claim 1, wherein the alignment slits are closed slits.

10. The pixel structure of claim 1, wherein the alignment slits extend to an edge of the pixel electrode.

11. A liquid crystal display, comprising:
an active device array substrate having a plurality pixel region, a plurality of scan lines, a plurality of data lines, and a plurality of pixel structures, each pixel region being defined by two neighboring scan lines and two neighboring data lines, wherein the pixel structures are respectively electrically connected with the corresponding scan lines and data lines, and each of the pixel structures comprising:
an active device;
a pixel electrode, which is electrically connected with the active device, disposed within one of the pixel region, and has a plurality of alignment domains and a spacing region disposed between the plurality of alignment domains to separate the plurality of alignment domains within said pixel region, each of the alignment domains comprising a group of alignment slits parallel with one another, wherein each group of the alignment slits comprises a plurality of first alignment slits with a first length and the first alignment slits are the majority in each group of the alignment slits, and at least one group of the alignment slits further comprises at least a second alignment slit with a second length longer than the first length of the first alignment slits, and the at least a second alignment slit of one of the alignment domains extends into the spacing region, wherein all of the alignment domains have the first alignment slits, and only a portion of the alignment domains has the at least a second alignment slit;
an opposite substrate; and
a liquid crystal layer disposed between the active device array substrate and the opposite substrate.

12. The liquid crystal display of claim 11, wherein areas of the alignment domains are substantially equal.

13. The liquid crystal display of claim 11, wherein a number of the alignment domains is 4.

14. The liquid crystal display of claim 11, wherein each of the alignment domains further comprises a third alignment slit shorter than the first alignment slits and parallel with the first alignment slits.

15. The liquid crystal display of claim 11, wherein the pixel electrode further comprises at least a fourth slit and the second alignment slits are arranged symmetrically along an extending direction of the fourth slit.

16. The pixel structure of claim 15, wherein the fourth slit is disposed at a border between neighboring alignment domains.

17. The liquid crystal display of claim 11, wherein the pixel structure further comprises a common line disposed at a border between the alignment domains and across the pixel electrode.

18. The liquid crystal display of claim 17, wherein the pixel electrode further comprises at least a fourth slit which is parallel with the common line and above the common line.

19. The liquid crystal display of claim 12, wherein the alignment slits are closed slits.

20. The liquid crystal display of claim 12, wherein the alignment slits extend to an edge of the pixel electrode.

21. The pixel structure of claim 1, wherein the at least a second alignment slit of one of the alignment domains does not connect with the first alignment slits and at least a second alignment slit of the other alignment domains.

22. The liquid crystal display of claim 11, wherein the at least a second alignment slit of one of the alignment domains does not connect with the first alignment slits and at least a second alignment slit of the other alignment domains.

23. A pixel structure, comprising:
a substrate comprising a plurality pixel region, a plurality of scan lines and a plurality of data lines, wherein each pixel region is defined by two neighboring scan lines and two neighboring data lines;
an active device; and
a pixel electrode electrically connected with the active device, disposed within one of the pixel region, and has a plurality of alignment domains within said pixel region, each of the alignment domains comprising a group of alignment slits parallel with one another, wherein each group of the alignment slits comprises a plurality of first alignment slits with a first length and the first alignment slits are the majority in each group of the alignment slits, and at least one group of the alignment slits further comprises at least a second alignment slit with a second length longer than the first length of the first alignment slits, wherein all of the alignment domains have the first alignment slits, and only a portion of the alignment domains has the at least a second alignment slit.

24. The pixel structure of claim 23, wherein areas of the alignment domains are substantially equal.

25. The pixel structure of claim 23, wherein a number of the alignment domains is 4.

26. The pixel structure of claim 23, wherein each of the alignment domains further comprises a third alignment slit with a third length shorter than the first length of the first alignment slits and parallel with the first alignment slits.

27. The pixel structure of claim 23, wherein the pixel electrode further comprises at least a fourth slit, and the second alignment slits are arranged symmetrically along an extending direction of the fourth slit.

28. The pixel structure of claim 27, wherein the fourth slit is disposed at a border between the neighboring alignment domains.

29. The pixel structure of claim 23, further comprising a common line disposed at a border between the alignment domains and across the pixel electrode.

30. The pixel structure of claim 29, wherein the pixel electrode further comprises at least a fourth slit which is parallel with the common line and above the common line.

31. The pixel structure of claim 23, wherein the alignment slits are closed slits.

32. The pixel structure of claim 23, wherein the alignment slits extend to an edge of the pixel electrode.

* * * * *